UNITED STATES PATENT OFFICE.

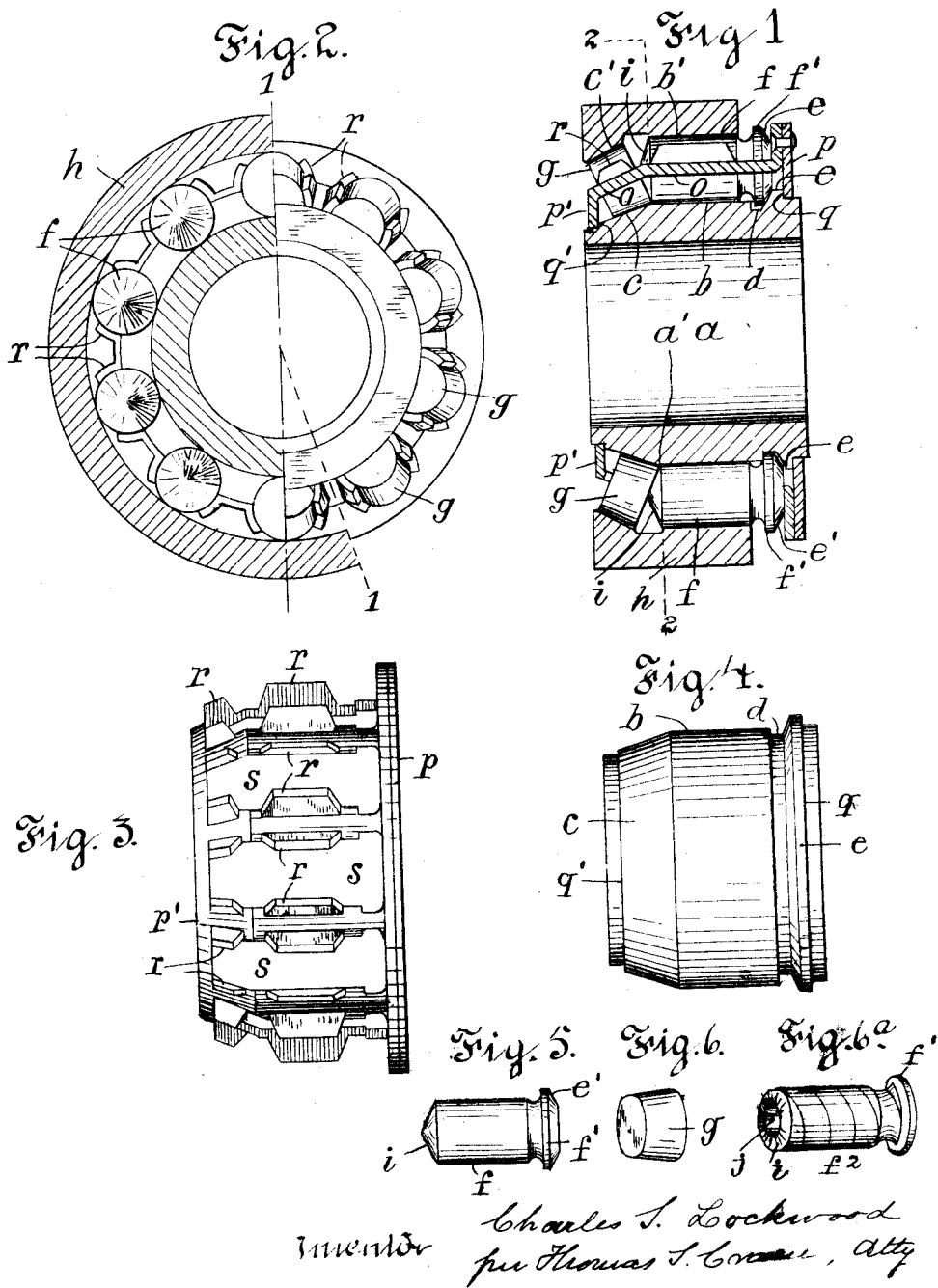

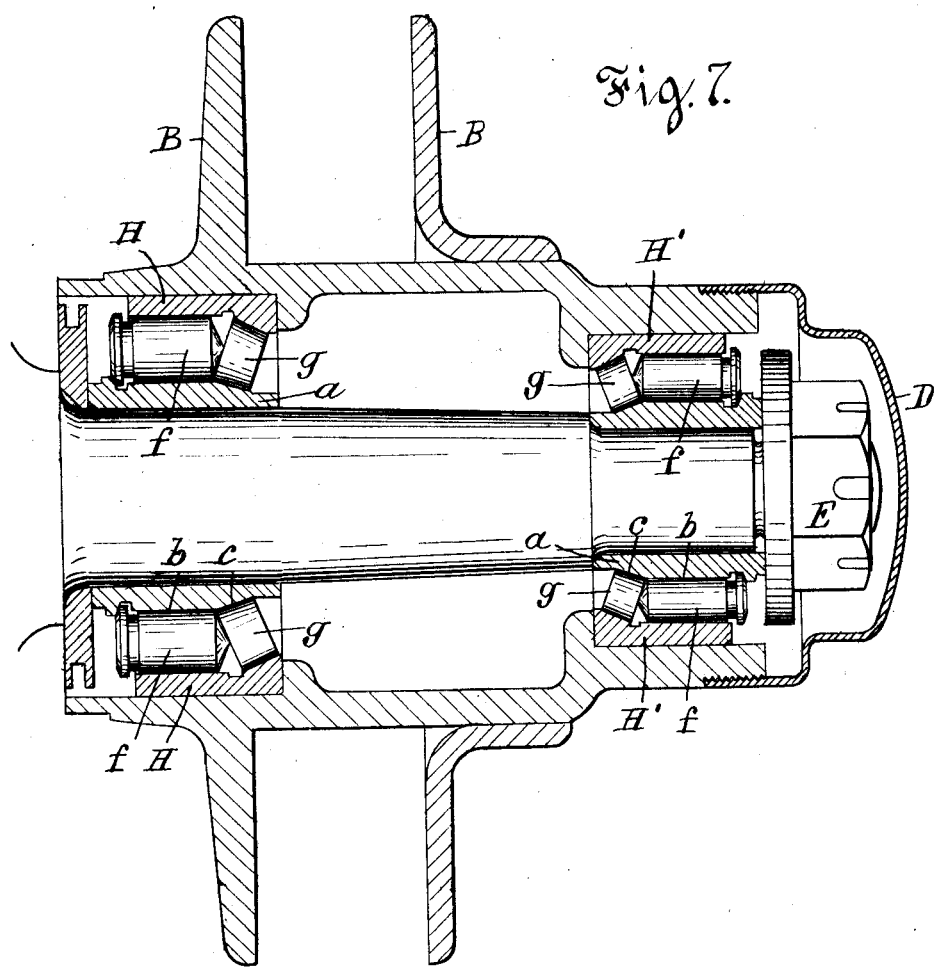

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING FOR SIDE AND END STRAIN.

1,193,276.

Specification of Letters Patent.

Patented Aug. 1, 1916.

Application filed April 15, 1916. Serial No. 91,269.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Roller-Bearings for Side and End Strain, fully described and represented in the following specification and the accompanying drawings, forming a part of the same.

The object of this invention is to furnish a roller bearing adapted to resist lateral and end strains, and this object is accomplished by forming a hub with a cylindrical seat and a conical seat adjacent thereto and tapering sets of cylindrical and tapering rolls respectively to the said seats with a cage to keep them in their working relation, and a casing applied to their exteriors. The cylindrical rolls resist lateral strain, and the tapering rolls operating with the tapering seat in the casing serve to resist end thrust. Lateral strain and end thrust both tend to crowd the tapering rolls upward upon the tapering seat of the hub, and the adjacent ends of the cylindrical rolls are arranged to contact with the adjacent ends of the tapering rolls, and each cylindrical roll is provided with a collar bearing upon a shoulder on the hub to resist the sliding tendency of the thrust rolls. To secure a frictionless contact between the cylindrical and thrust rolls, the ends of the cylindrical rolls next the junction of the hub-seats are tapered or coned to bear upon the adjacent ends of the tapering rolls. A groove is formed in the hub to clear the collars upon the rolls, and the rib is projected at the outer side of the groove to form the required shoulder. The cylindrical rolls may be made solid or hollow, in the former case the ends being completely conical and bearing against a flat surface upon the larger end of the tapering rolls. When the cylindrical rolls are hollow or tubular the ends are tapered for the thickness of the tube and bear upon the ends of the tapering rolls in like manner. With a casing fitted upon the outer sides of all the rolls, the bearing is adapted to resist thrust in one direction only, but two such constructions may be applied reversely to opposite ends of the same shaft or a journal-box so as to resist thrust in both directions.

The invention will be understood by reference to the annexed drawing, in which—

Figure 1 is a section on line 1—1 in Fig. 2; Fig. 2 in its right-hand half is an end elevation of the hub and the rolls and cage thereon, and in its left-hand half a section on line 2—2 in Fig. 1. Fig. 3 is a side elevation of the cage; Fig. 4 is a side elevation of the hub; Fig. 5 is a side elevation of one of the cylindrical rolls; and Fig. 6 is a perspective view of one of the tapering rolls. Fig. 6ª is perspective of a tubular roll; and Fig. 7 is a longitudinal section of a wheel axle with the wheel-hub having opposite bearings in its opposite ends.

In Figs. 1 to 4 inclusive, the hub $a$ is shown provided with the cylindrical seat $b$, and the tapering seat $c$ extended from one end of said seat. A groove $d$ is formed at the opposite end of the cylindrical seat. An annular ridge $e$ projects from the hub at the rear edge of the said groove, and the depth of the groove $d$ below the seat $b$ and the projection of the ridge $e$ above the line of the seat are about equal. Cylindrical rolls $f$ are fitted to the seat $b$ and tapering rolls $g$ to the seat $c$. These tapering rolls will be termed "thrust rolls" herein. A casing $h$ is formed with seats $b'$ and $c'$ to fit the outer sides of the cylindrical and thrust rolls respectively. The inner corners of the cylindrical and thrust rolls contact at the junction of the seats $b$ and $c$, and the end of the thrust roll next such corner is made flat. The contiguous end of the cylindrical roll is formed with a cone or taper $i$ shaped to make a rolling contact with the flat end of the thrust roll. The opposite ends of the cylindrical rolls are formed each with a collar $f'$ to contact with the annular ridge $e$ upon the hub, such collar and ridge being beveled where they contact with one another, and the collar extending into the groove $d$ so as to contact equally with the rib within and outside the line of the seat. The bevel on the collar is marked $e'$.

The rib on the outer side of the groove forms a shoulder to resist the sliding tendency of the thrust rolls which is transmitted to the cylindrical rolls, and the portions of the collar which extend respectively into the groove and which contact with the projecting ridge $e$, move respectively at a greater and less velocity than the surface of the roll where it rolls upon the seat $b$. The friction produced by these two portions of the collar tend respectively to advance and to retard the collared end of the roll, and may in practice be made to balance one another so that the collar produces no tendency of the rolls to twist out of alinement with the axis of the hub.

The cylindrical and thrust rolls are located in pairs so that each of the cylindrical rolls may resist any end movement of the contiguous thrust roll, and they are kept in a proper relation to one another by a cage formed of a shell having a cylindrical portion $o$ and an integral tapering portion $o'$, with flanges $p$, $p'$ at opposite ends adapted to bear against shoulders $q$, $q'$ upon the hub. Apertures $s$ are formed in the cage to receive and hold the rolls of each pair in alinement with one another, and wings $r$ at opposite edges of each aperture bend over the outer sides of the rolls to retain them upon their seats. The use of such wings is common to keep a set of rolls in connection with a hub, and my present improvement consists in making such a cage with two portions one cylindrical and the other tapering, so as to maintain cylindrical and tapering rolls in end engagement.

To permit the end contact of the rolls in each pair requires that the apertures $s$ in the cage should be continuous or connected, that is, extending the entire length of both rolls; and to secure a frictionless rolling contact of the rolls at their contiguous ends, they have end surfaces shaped respectively to rotate at equal surface velocity so as not to create any rubbing friction. To effect this, the larger ends of the thrust-rolls are formed cone-shaped and the larger ends of the thrust-rolls are made twice the diameter of the sloping side of the cone.

The portions of both rolls adjacent to the junction $o'$ of the cylindrical and tapering seats necessarily revolve at the same speed, being located at the same axis of the hub, and the contacting surfaces of the rolls have the same radius of contact, and thus roll together without friction. The construction thus affords a means of resisting the end thrust with a minimum of frictional resistance.

Two of the bearings may be employed to resist end thrust in different directions by applying them to opposite ends of a shaft or journal. Such an application is shown in Fig. 7, where a wheel-center A is represented in section with flanges B to attach the spokes of the wheel. The opposite ends of the journal C are made of different sizes to permit the assembling and removal of the parts by unscrewing the cap D and nut E upon the end of the journal.

The hubs $a$ have the tapering or conical seats upon their adjacent ends, and the casings H and H' are therefore furnished with tapering seats upon their inner ends which, when fitted to the tapering rolls, resist thrust in opposite directions. The hub of the outer bearing (within the casing H') is fitted loosely to the end of the journal, and when the cap and nut are removed the withdrawal of the wheel-center from the journal draws the entire outer bearing off with it, but only carries with it the casing H of the inner bearing. The parts are thus readily exposed for examination, and as readily assembled for use. It will be noticed that the casing $h$, H or H' extend only over the cylindrical bearing surface of the cylindrical roll, thus clearing the collar $f'$ upon the roll which projects above the bearing surface.

Having thus set forth the nature of the invention what is claimed herein is:

1. In a roller bearing to carry side and end strains, the combination, with a hub having a cylindrical seat and a tapering seat adjacent thereto, of rolls fitted respectively to the said seats and abutting against one another.

2. In a roller bearing to carry side and end strains, the combination, with a hub having a cylindrical seat and a tapering seat adjacent thereto, of rolls fitted respectively to the said seats and having end surfaces rotating at equal velocity and abutting against one another.

3. In a roller bearing, the combination, with a hub having a cylindrical seat and a tapering seat adjacent thereto, of cylindrical rolls fitted to the cylindrical seat and tapering rolls fitted to the tapering seat, and the cylindrical rolls having each a tapering or conical end abutting upon an adjacent flat end of a tapering roll.

4. In a roller bearing, the combination, with a hub having a cylindrical seat formed with a shoulder as set forth, and a tapering seat adjacent to the cylindrical seat, of cylindrical rolls fitted to the cylindrical seat and tapering rolls fitted to the tapering seat and contacting each with the end of a cylindrical roll, a casing having cylindrical and tapering seats to bear upon the said rolls, and a collar upon each of the cylindrical rolls engaging a shoulder upon the cylindrical seat of the hub.

5. In a roller bearing, the combination, with a hub having a cylindrical seat and a tapering seat adjacent thereto, of cylindrical rolls fitted to the cylindrical seat and tapering rolls fitted to the tapering seat and contacting each with the end of a cylindrical roll, a casing having cylindrical and tapering seats to bear upon the said rolls, a shoulder at the end of the cylindrical seat of the hub beyond the bearing portion of the cylindrical roll, and collars upon the rolls clearing the end of the casing and engaging the shoulder upon the hub-seat.

6. In a roller bearing, the combination, with a hub having a cylindrical seat and a tapering seat adjacent thereto, of cylindrical rolls fitted to the cylindrical seat and tapering rolls fitted to the tapering seat, and a cage-body having a cylindrical portion and a tapering portion provided with connecting apertures to receive the cylindrical rolls and the tapering rolls.

7. In a roller bearing, the combination, with a hub having a cylindrical seat and a tapering seat adjacent thereto, of cylindrical rolls fitted to the cylindrical seat and tapering rolls fitted to the tapering seat, and a cage-body formed of a shell having a cylindrical portion and a conical portion provided with connecting apertures to receive the cylindrical rolls and the tapering rolls, and the edges of the apertures provided with wings overlapping the outer sides of the rolls to hold them upon their respective seats.

8. In a roller bearing, the combination, with a hub having a cylindrical seat and a tapering seat adjacent thereto, of cylindrical rolls fitted to the cylindrical seat and tapering rolls fitted to the tapering seat, a cage-body having a cylindrical portion and a tapering portion provided with connecting apertures to receive the cylindrical rolls and the tapering rolls, flanges upon the ends of the cage, and shoulders upon the hub to engage the said flanges to guide the cage thereon.

9. A wheel-center having roller bearings fitted in its opposite ends, the hubs in the bearings having cylindrical seats, and tapering seats upon the adjacent ends of such hubs, corresponding casings in the wheel-center, cylindrical rolls fitted between the said hubs and casings, and tapering rolls fitted to the tapering seats and contacting respectively with the rolls upon the adjacent cylindrical seats.

10. A wheel-center having roller bearings fitted in its opposite ends each hub having a cylindrical seat with a groove and projecting ridge at its outer end and a conical seat at its inner end, cylindrical rolls fitted to the cylindrical seats and having collars bearing upon the said ridge, tapering rolls fitted to the tapering seats and having a rolling contact with the ends of the cylindrical rolls, and casings in the wheel-center fitted to the cylindrical and tapering rolls and extended only over the bearing surface of the cylindrical rolls, so as to clear the collars upon the said rolls.

In testimony whereof I have hereunto set my hand.

CHARLES S. LOCKWOOD.